United States Patent [19]

Willette

[11] Patent Number: 5,599,190
[45] Date of Patent: Feb. 4, 1997

[54] COMMUNICATION WIRING SYSTEM INCLUDING A RECONFIGURABLE OUTLET ASSEMBLY

[75] Inventor: A. David Willette, Winston-Salem, N.C.

[73] Assignee: The Whitaker Corporation, Wilmington, Del.

[21] Appl. No.: 379,248

[22] Filed: Jan. 27, 1995

[51] Int. Cl.$^6$ .................................................. H01R 29/00
[52] U.S. Cl. .............................. 439/49; 439/536; 439/43; 348/6
[58] Field of Search ................................ 439/49, 43, 54, 439/536, 540.1, 538, 539, 535, 638; 348/6

[56] References Cited

U.S. PATENT DOCUMENTS

| | | | |
|---|---|---|---|
| 3,842,320 | 10/1974 | Kiesling | 317/99 |
| 4,725,249 | 2/1988 | Blackwood et al. | 439/535 |
| 4,756,695 | 7/1988 | Lane et al. | 439/535 |
| 4,758,536 | 7/1988 | Miller et al. | 439/138 |
| 4,860,343 | 8/1989 | Zetena, Jr. | 379/110 |
| 4,928,303 | 5/1990 | Allin et al. | 379/93 |
| 5,027,426 | 6/1991 | Chiocca, Jr. | 455/5 |
| 5,043,531 | 8/1991 | Gutenson et al. | 174/49 |
| 5,064,386 | 11/1991 | Dale et al. | 439/535 |
| 5,117,122 | 5/1992 | Hogarth et al. | 307/140 |
| 5,130,893 | 7/1992 | Straate et al. | 361/752 |
| 5,205,758 | 4/1993 | Comerci et al. | 439/535 |
| 5,272,277 | 12/1993 | Humbles et al. | 174/48 |
| 5,366,388 | 11/1994 | Freeman et al. | 439/49 |

Primary Examiner—Gary F. Paumen
Assistant Examiner—T. C. Patel

[57] ABSTRACT

A communications wiring system includes a communications network interface device for routing a plurality of source signals between respective ones of a plurality of types of electrical sources and a number of reconfigurable outlet assemblies. Each reconfigurable outlet assembly selectively establishes electrical connection with predetermined ones of the electrical sources, via a cable. The communications network interface device receives and splits the source signals into a predetermined number of subsignals which are routed to respective reconfigurable outlet assemblies. Each reconfigurable outlet assembly includes an outlet and a number of interchangeable electrical connectors, such as modular jacks, adapted to be removably mounted to the outlet for establishing electrical connection with a predetermined electrical source. In order to establish electrical connection with a different electrical source, a first electrical connector can be removed and a second electrical connector can be inserted therein. Accordingly, the communications wiring system of the present invention can be readily reconfigured by interchanging the electrical connectors to establish electrical connection with different electrical sources without rewiring.

14 Claims, 7 Drawing Sheets

COMMUNICATION WIRING SYSTEM INCLUDING A RECONFIGURABLE OUTLET ASSEMBLY

FIELD OF THE INVENTION

The present invention relates generally to wiring systems and, more particularly, to wiring systems for a communications network.

BACKGROUND OF THE INVENTION

The wiring systems of many modern buildings and residences typically include a number of separate wiring systems. Each wiring system is generally dedicated to transmitting a predetermined type of signal. For example, many buildings include separate wiring systems for telephone signals and for cable television signals. Each wiring system typically requires a separate network interface device which interconnects a drop or source cable to each of the distribution cables which extend to respective outlets positioned in various locations throughout the building. Accordingly, each wiring system also generally requires a plurality of dedicated outlets to provide electrical connection with the respective wiring system.

For example, a telephone and cable television subscriber generally has both a telephone network interface device and a cable television network interface device associated with their residence. These network interface devices which are typically limited to external signal sources generally have a housing to provide environmental protection and are mounted to the building, such as within an interior closet or on an exterior wall of the building. However, it is not uncommon for subscribers to require internal sources of signals, such as internal networking, security, audio, etc. Accordingly, the network interface devices can include both internal and external sources.

By way of example, a cable television network interface device receives incoming cable television signals such as via a cable television drop cable which extends from the cable television trunk cable to the cable television network interface device. The cable television network interface device splits the incoming cable television signals and transmits the split cable television signals along each of a plurality of distribution cables. Both the cable television drop cable and the related distribution cables are generally coaxial cables. Each distribution cable is typically routed from the cable television network interface device to a predetermined location within the building. At the predetermined location, the distribution cable can be connected to a cable television outlet. The cable television subscriber can then connect their television to the cable television outlet to receive the incoming cable television signals.

Likewise, a telephone network interface device typically receives and transmits telephone signals, such as via telephone drop cable which extends from a telephone trunk cable to the telephone network interface device. The telephone network interface device passes through the telephone signals received from the telephone drop cable and routes the telephone signals, via telephone distribution cables, to predetermined locations within the building. At each of the predetermined locations, the telephone distribution cables can be connected to a telephone outlet. By plugging an appropriate electrical connector, such as a telephone plug, into the telephone outlet, the subscriber can establish telephonic communications with another telephone or other telecommunications device.

While a telephone outlet may be in the vicinity of a cable television outlet, telephone outlets and cable television outlets are oftentimes positioned in different locations within the same room or in different rooms altogether. For example, within a bedroom, a telephone outlet is generally located on a wall near the head of the bed. In contrast, if there is a cable television outlet in the bedroom, the cable television outlet is generally located on the wall opposite the head of the bed such that the television can be viewed from the bed.

In addition, the distribution conductors which route the cable television signals and the telephone signals to the cable television outlets and the telephone outlets, respectively, are generally different types of conductors. For example, the distribution conductors for transmitting telephone signals typically include one or more twisted pairs of wire. In contrast, the distribution conductors for transmitting cable television signals are usually coaxial cables.

Further, modern buildings may include other types of wiring systems, such as an internal intercom system to provide communications between different rooms of the building. An intercom wiring system is separate from the cable television, telephone and electrical wiring systems and includes different distribution conductors and different outlets generally positioned at different locations within the building. The intercom outlets can include both a speaker and a receiver for transmitting and receiving communications within the room, respectively. Finally, the residence or building, such as an office, may require a system for transmitting a variety of signals, from audio or security, to mini-networking.

Although the various outlets are generally located at different positions within a room, a number of integrated outlet assemblies have been developed which include a variety of dedicated outlets. For example, U.S. Pat. No. 5,117,122 to Peter T. Hogarth, et al. which issued May 26, 1992 (hereinafter the "Hogarth '122 patent") describes an integrated outlet which includes a plurality of modules. The integrated outlet can contain separate modules to establish electrical connection with predetermined conductors of both a ribbon cable and a coaxial cable. The ribbon cable can include conductors transmitting AC power signals, DC power signals, television signals and telecommunications signals, such as telephone signals. The integrated outlet of the Hogarth '122 patent can therefore include one or more coaxial cable jacks, a telephone jack and a number of AC and DC power outlets. Accordingly, simultaneous electrical connection can be established with a number of conductors of the ribbon cable and the coaxial cable by tapping the jacks and outlets of the integrated outlet with appropriate plugs. Each jack or outlet of the integrated outlet of the Hogarth '122 patent is dedicated, however, to establishing electrical connection with only predetermined conductors of the ribbon cable or the coaxial cable so as to thereby establish electrical connection with a predetermined electrical source.

Another integrated outlet which can include a plurality of dedicated jacks and outlets for providing electrical connection to AC power signals, telephone signals and cable television signals is described in U.S. Pat. No. 5,064,386 to James L. Dale, et al. which issued Nov. 12, 1991 and is assigned to The Whitaker Corporation (hereinafter the "Dale '386 patent"). The electrical outlet of the Dale '386 patent can include coaxial cable jacks, telephone jacks and AC and DC electrical outlets for providing simultaneous electrical connection with cable television signals, telecommunications signals and power signals, respectively. In particular, the various jacks and outlets of the electrical outlet of the Dale '386 patent establish electrical contact with a number of conductors of a hybrid cable which includes both power and signal conductors. While a significant advance in the art, each jack or outlet of the electrical outlet of the Dale '386 patent is also dedicated, however, to establishing electrical connection with only predetermined conductors of the hybrid cable so as to thereby establish electrical connection with a predetermined electrical source.

See also U.S. Pat. No. 4,758,536 which issued Jul. 19, 1988 to Vernon R. Miller, et al. and is assigned to The Whitaker Corporation; and U.S. Pat. No. 3,842,320 which issued Oct. 15, 1974 to Casper Kiesling and is assigned to the Raymond Lee Organization, Inc. which describe other types of integrated electrical outlets.

SUMMARY OF THE INVENTION

It is therefore an object of the present invention to provide an improved communications wiring system.

It is another object of the present invention to provide an outlet assembly which can be readily reconfigured without significant rewiring.

These and other objects are provided, according to the present invention, by a communications wiring system including a communications network interface device for routing a plurality of source signals from a plurality of types of electrical sources via a plurality of cables, and a plurality of reconfigurable outlet assemblies, one of which is associated with each cable, for selectively establishing electrical connection with the plurality of electrical sources.

Each reconfigurable outlet assembly includes an outlet and a plurality of interchangeable electrical connectors, such as modular jacks, adapted to be removably mounted to the outlet. Each connector is preferably designed to establish electrical connection with a different electrical source. Thus, the connectors can be readily replaced or interchanged to provide electrical connection with a different electrical source as desired. Each connector includes means for establishing electrical connection with the distribution conductors of the respective cable which are connected to a predetermined electrical device so as to thereby establish electrical connection with the predetermined electrical source. Each connector also includes removal means for disconnecting the connector from the respective cable such that the connector can be removed from the outlet and another of the plurality of interchangeable connectors can be mounted to the outlet to establish electrical connection with another electrical source. Thus, a single outlet can readily provide electrical connection with a variety of electrical sources, such as cable television, telephone, and low voltage DC power.

The outlet of the reconfigurable outlet assembly generally includes connector means for positioning predetermined ones of the plurality of individual wires of the respective cable in a predetermined order. The outlet also includes a housing having a first surface and defining an internal cavity which opens through the first surface. According to the present invention, each of the plurality of interchangeable connectors are sized to be individually inserted within the internal cavity of the outlet and to removably mount to the connector means of the outlet.

More particularly, the connector means can include a plurality of elongate conductors. Each elongate conductor has an insulation displacement contact portion at a first end for establishing electrical contact with a predetermined distribution conductor of the respective cable. In addition, each elongate conductor has a resilient contact portion at a second end, opposite the first end, for establishing electrical contact with a complementary connector inserted within the internal cavity of the outlet. The resilient contact portions of the elongate conductor are preferably arranged in a predetermined order.

According to one embodiment, the removal means of the connectors includes a deflectable tab having a raised shoulder. The housing of this embodiment also includes means for deflecting and cooperatively engaging the raised shoulder of the connector as the connector is inserted therein. According to the present invention, the plurality of connectors can include television jacks, cable television jacks, speakers, receivers, and DC low voltage power outlets.

The communications wiring system of the present invention also may include a communications network interface device including subdividing means for splitting each source signal into a predetermined number of subsignals. Each subsignal is then transmitted by a separate distribution conductor to a reconfigurable outlet assembly. The communications network interface device also includes output means for arranging the plurality of distribution conductors into a plurality of cables. Each cable preferably includes a plurality of distribution conductors which transmit subsignals originating with a plurality of types of electrical sources, such as telephone signals, cable television signals and power signals, for example.

The communications network interface device can also include input means for receiving a plurality of source cables which are communicably connected to predetermined ones of a plurality of types of electrical sources. Preferably, each source cable transmits a source signal from a predetermined electrical source to the communications network interface device.

According to one embodiment, the subdividing means of the communications network interface device includes a printed circuit board defining a plurality of conductive traces. According to this embodiment, the input means can include a first connector having a plurality of conductors. Each conductor preferably has an insulation displacement contact portion at a first end for establishing electrical contact with a predetermined one of the source cables. Each conductor is also adapted at a second end, opposite the first end, for electrically contacting a predetermined conductive trace defined on the printed circuit board.

Likewise, the output means of this embodiment can include a plurality of second connectors, each of which have a plurality of conductors. Each conductor preferably has an insulation displacement contact portion at a first end for establishing electrical contact with a predetermined one of the distribution conductors. Each conductor is also adapted at a second end, opposite the first end, to make electrical contact with a predetermined conductive trace defined on the printed circuit board. Accordingly, a distribution conductor can be electrically connected to a predetermined electrical source.

More particularly, the insulation displacement contact portions of the plurality of the conductors of each second connector preferably establish electrical connection with the plurality of distribution conductors of a respective hybrid cable. In addition, the second ends of the plurality of conductors of each second connector preferably electrically contact a plurality of conductive traces defined on the printed circuit board which transmit signals originating with a plurality of types of electrical sources.

According to one embodiment, the communications network interface device receives a coaxial cable for transmitting cable television signals. According to this embodiment, the subdividing means further includes amplifier means for amplifying the cable television signals transmitted by the coaxial cable.

According to the present invention, a first interchangeable electrical connector, such as a modular jack, can be removably mounted to an outlet to establish electrical connection with predetermined ones of the distribution conductors of a respective cable, thereby also establishing electrical connection with a predetermined electrical source. If desired, such first electrical connector can thereafter be removed from the outlet and replaced by a second interchangeable connector which is removably mounted to the outlet to establish electrical connection with other predetermined distribution conductors of the respective cable, thereby establishing electrical connection with another predetermined electrical source. Accordingly, the same outlet can sequentially receive a number of electrical connectors which permit electrical connection with a variety of types of electrical sources, such as cable television, telephone, and low voltage DC power. Thus, the outlet assemblies of the present invention can be readily reconfigured without rewiring the outlet.

BRIEF DESCRIPTION OF THE DRAWINGS

FIG. 8 is a perspective view of an assembled reconfigurable outlet assembly having adapted to only receive a single modular jack.

DETAILED DESCRIPTION OF THE PREFERRED EMBODIMENTS

Figure 1:
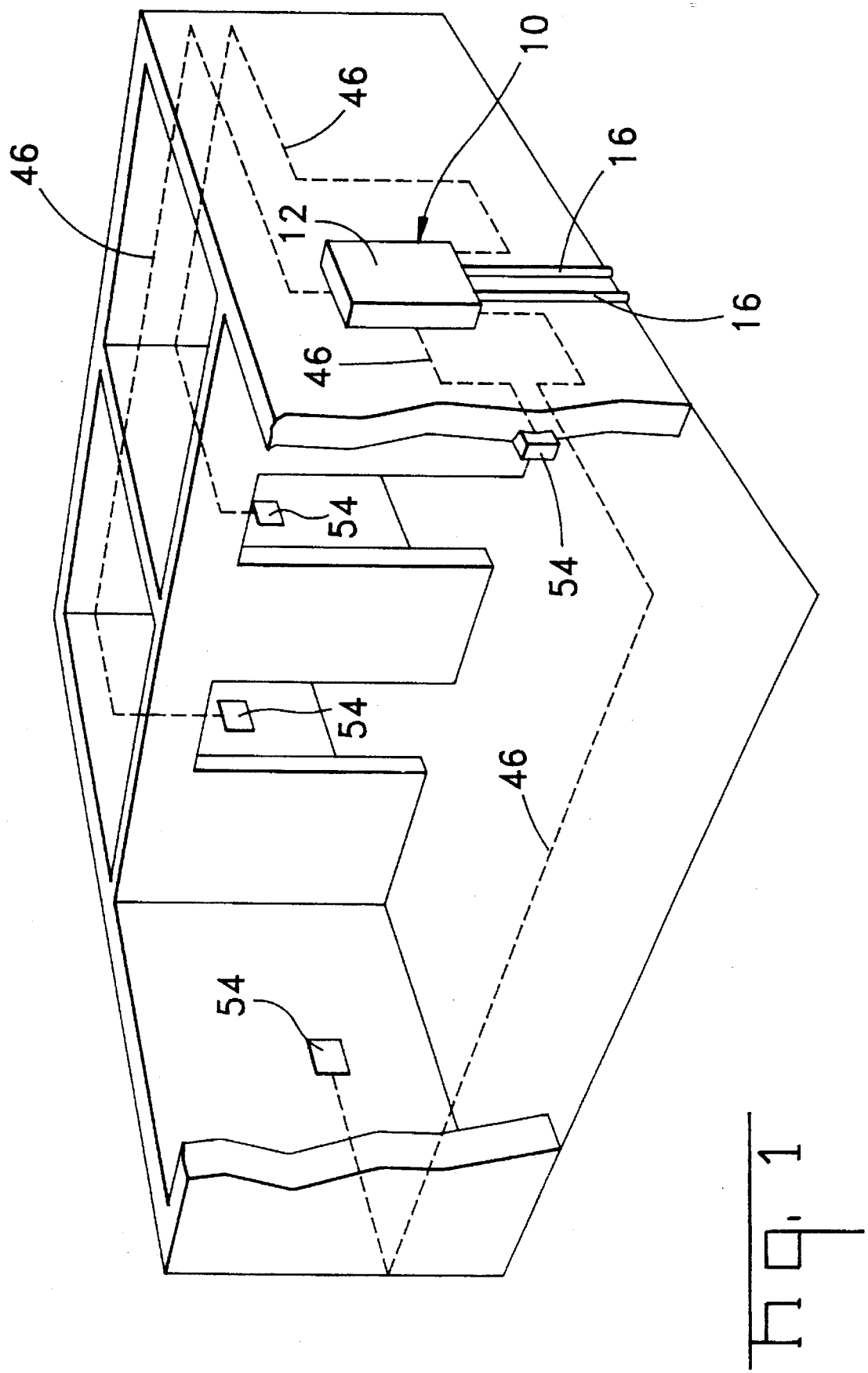
FIG. 1 is a perspective view of building which is partially broken away to illustrate the communications wiring system of the present invention.

Various methods and apparatus embodiments of the invention are set forth below. While the invention is described with reference to specific preferred methods and apparatus including those illustrated in the drawings, it will be understood that the invention is not intended to be so limited. To the contrary, the invention includes numerous alternatives, modifications and equivalents as will become apparent from consideration of the present specification including the drawings, the foregoing discussion, and the following detailed description. For instance, while the preferred application of this invention is directed to a wiring system for a communication network of a building or residence, it has applicability to a section thereof, such as an office within a building. That is, the interface device may be a rack mounted installation in an office, or a portion of the building.

Referring now to FIG. 1, a communications wiring system is illustrated. For this illustration, the communications wiring system is installed in a house. As will be apparent to those skilled in the art, however, the communications wiring system of the present invention can be installed in a variety of other buildings and structures, or substructures, without departing from the spirit and scope of the present invention.

As illustrated, the communications wiring system includes a communications network interface device 10. The communications network interface device typically includes a housing 12 which is mounted to the house, such as in an interior closet or on an exterior wall of the house as shown. The housing, when exteriorally mounted, typically may comprise a metallic or plastic material to provide environmental protection and prevent undesirable tampering with the communications network interface device.

Figure 2:
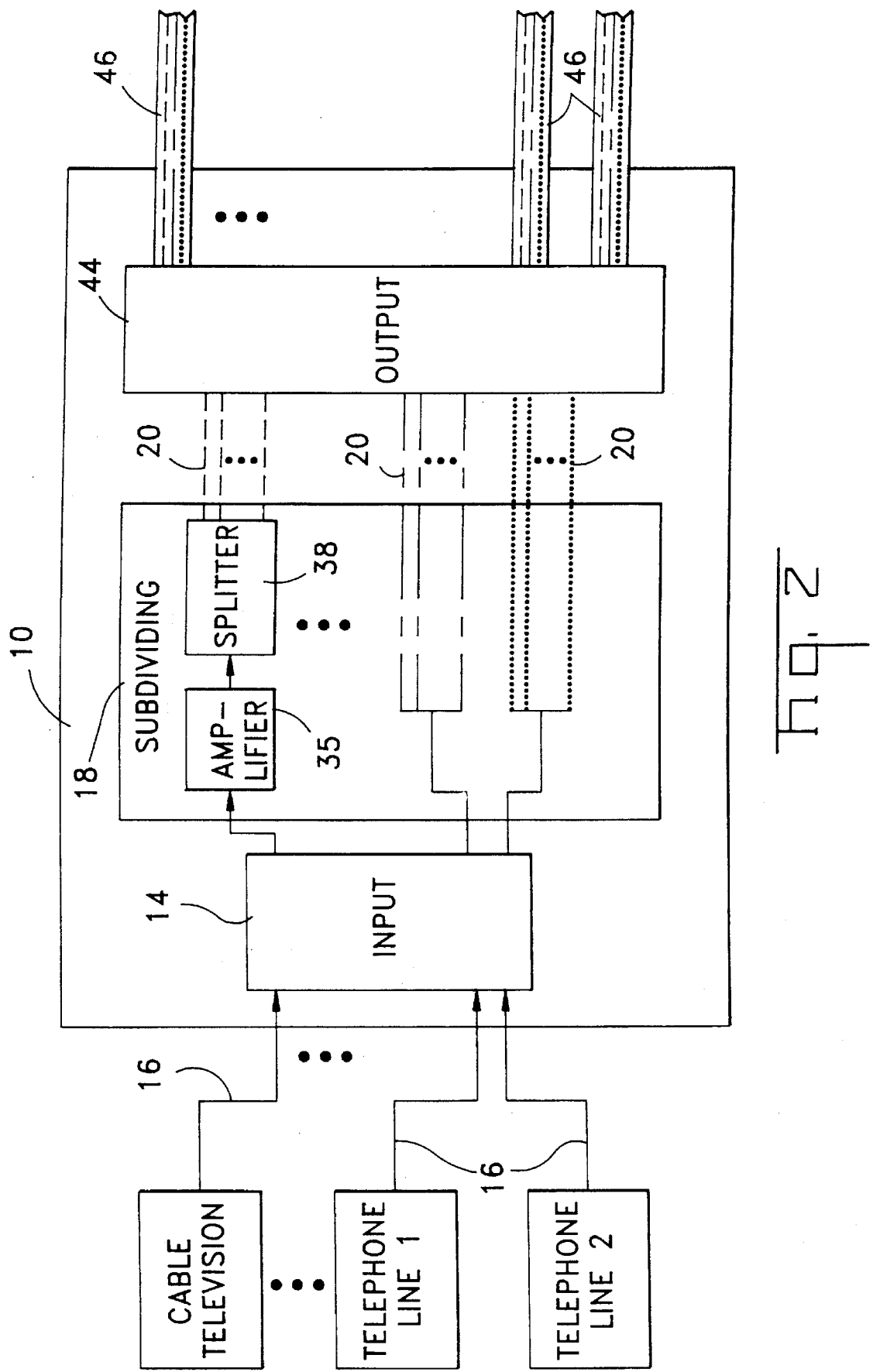
FIG. 2 is a block diagram of the communications network interface device of the wiring system of the present invention.

As shown in block diagram form in FIG. 2, the communications network interface device 10 of the present invention generally includes input means 14 for receiving a plurality of source cables 16. The source cables are communicably connected to predetermined ones of a plurality of types of electrical sources. For example, a first source cable can include a cable television drop cable which extends from a cable television trunk cable to the communications network interface device and which transmits cable television signals. As known to those skilled in the art, the cable television drop cable is generally a coaxial cable. Similarly, a second source cable can include a telephone drop cable which extends from a telephone trunk cable to the communications network interface device and which transmits telephone signals. As also known to those skilled in the art, the telephone drop cable is generally comprised of one or more twisted pairs of wires. Accordingly, each source cable transmits a source signal, such as a cable television signal or a telephone signal, between a predetermined electrical source and the communications network interface device.

As also shown schematically in FIG. 2, the communications network interface device 10 can also include subdividing means 18, responsive to the input means 14, for passing through or splitting the respective source signals transmitted by the plurality of source cables 16 into a predetermined number of subsignals. Each subsignal preferably includes the same information as the source signal from which it originates. As illustrated, the subdividing means preferably includes a plurality of distribution conductors 20, each of which preferably transmits a predetermined one of the subsignals. In one embodiment, each distribution conductor is comprised of a plurality of pairs of twisted wires. However, the distribution conductor can, instead, be comprised of other types of conductors without departing from the spirit and scope of the present invention.

Figure 3:
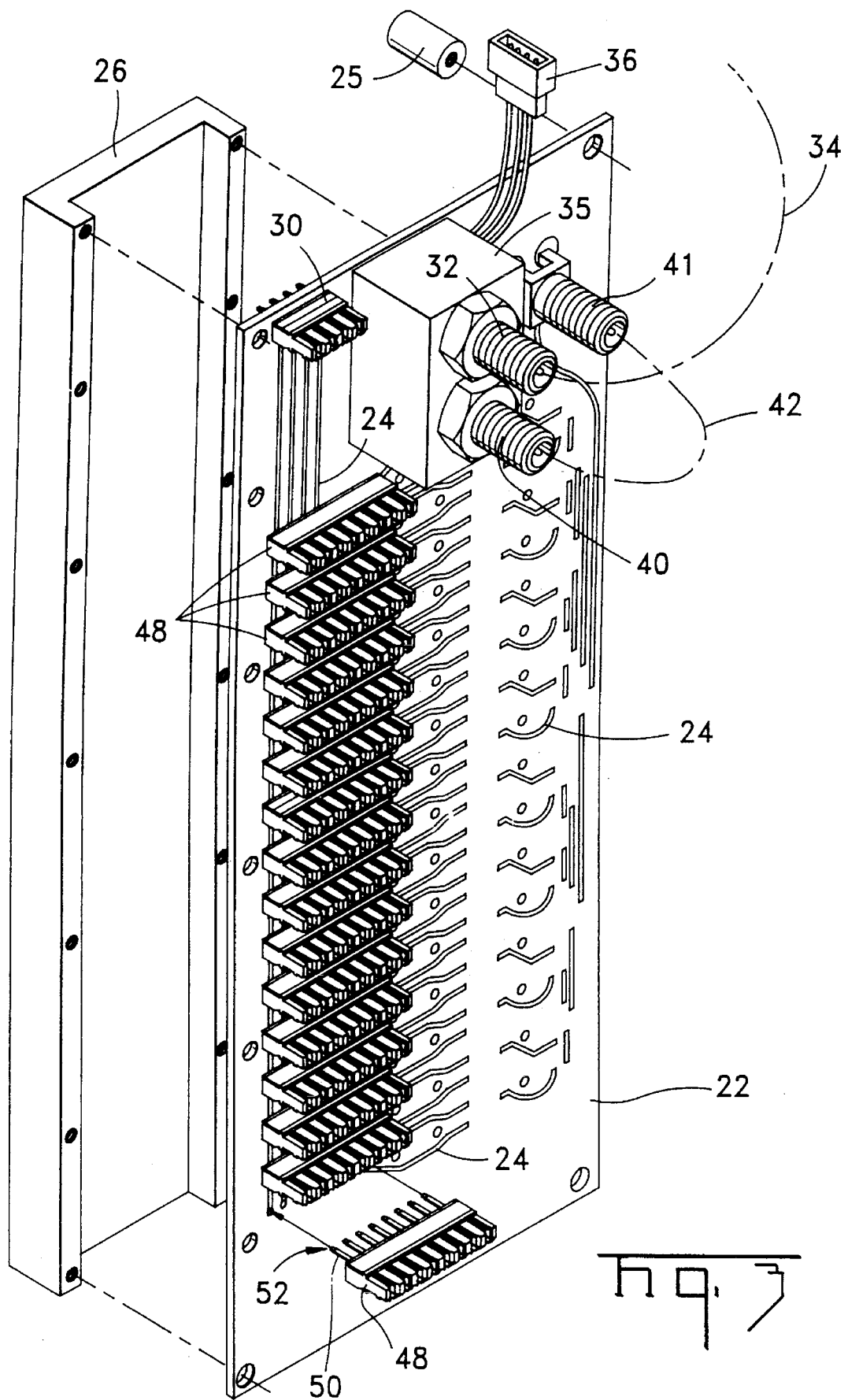
FIG. 3 is a partially exploded perspective view of a portion of the communications network interface device illustrating the printed circuit board and associated connectors.
Figure 4:
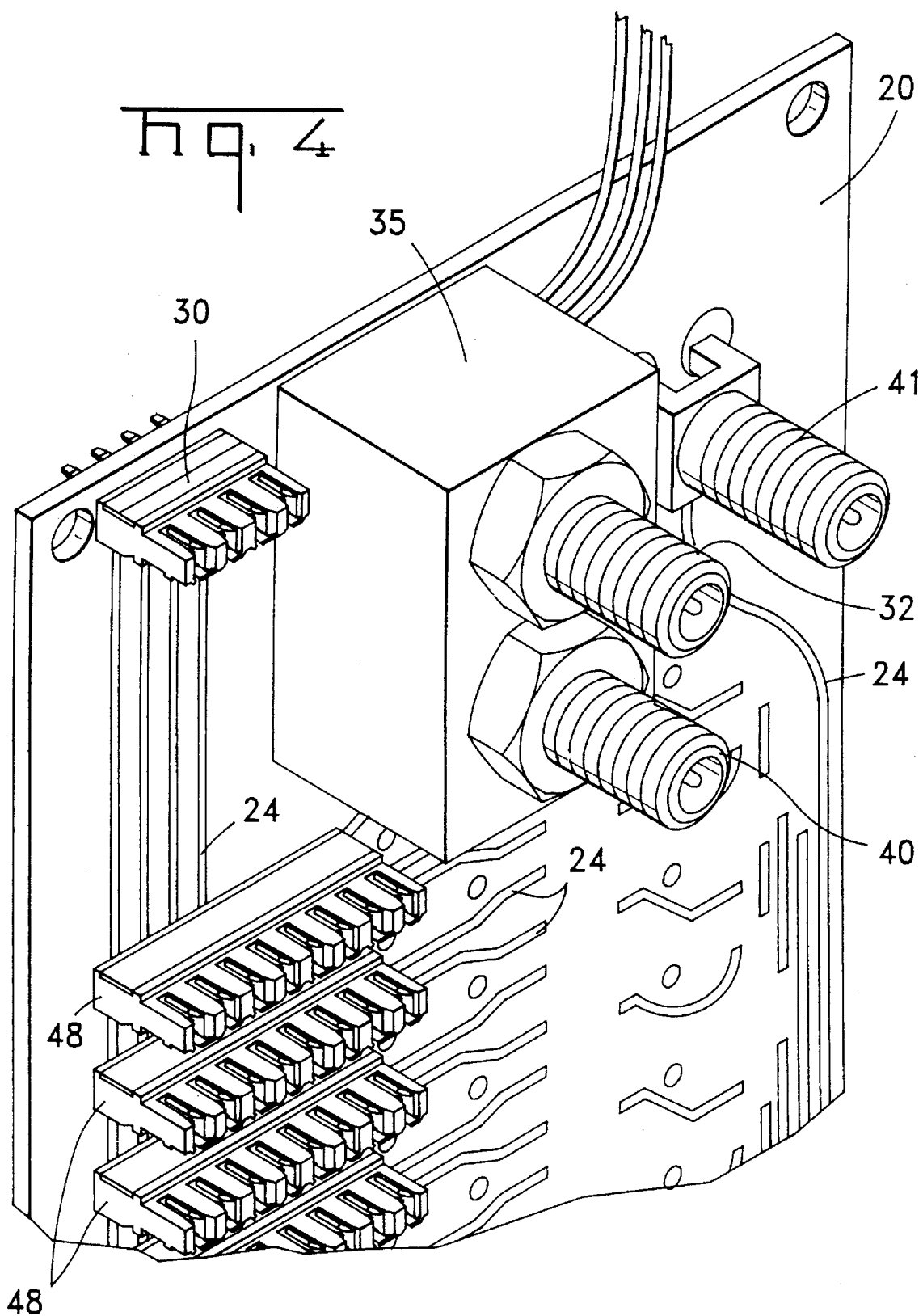
FIG. 4 is enlarged fragmentary perspective view of portion of the communications network interface device illustrated in FIG. 3.

According to one embodiment shown in more detail in FIGS. 3 and 4, the subdividing means 18 includes a printed circuit board 22 defining a plurality of conductive traces 24 thereon. The printed circuit board is preferably mounted within and protected by the housing 12. As shown in FIG. 3, the printed circuit board is preferably mounted within the housing with a holder 26, typically comprised of an insulating material, such as plastic, which electrically isolates the printed circuit board from the housing. In addition, fasteners (not shown) which connect the printed circuit board to the housing can extend through apertures defined in the printed circuit board and aligned standoffs 28. The standoffs are also comprised of an insulating material to provide additional electrical isolation between the printed circuit board and the housing.

According to this embodiment, the input means can include a first connector 30, such as a 110-type connector having a plurality of conductors. Each conductor of the 110-type connector has an insulation displacement contact portion at a first end for establishing electrical contact with a predetermined one of the source cables 16. Each conductor is also adapted at a second end, opposite the first end, for electrically contacting a predetermined conductive trace 24 defined on the printed circuit board 22 and, more particularly, for electrically contacting a plated through hole defined in the printed circuit board.

Thus, according to this embodiment, a conductor of the first connector 30 establishes electrical contact with a predetermined one of the source cables 16 and couples the source signals transmitted by the predetermined source cable to the conductive trace 24 with which the conductor is in electrical contact. For example, the source cable can be a telephone drop cable which transmits telephone signals via a twisted pair of wires. Thus, each wire of the twisted pair can be inserted into a separate insulation displacement contact portion of the first connector. The signals transmitted by each of the twisted pair of wires are thereby coupled to and transmitted by a respective conductive trace defined on the printed circuit board 22. The source cables are not shown in FIGS. 3 and 4, however, for the sake of clarity.

One or more of the source cables 16 can also be a coaxial cable, such as for transmitting cable television signals. Coaxial source cables are also preferably connected to a connector 32 mounted on the printed circuit board 22. For the sake of clarity, the coaxial source cables are also not illustrated in FIGS. 3 and 4, but, instead, the general path of a coaxial source cable is shown by a dashed line 34. As shown, the coaxial cable can be threadably engaged by the coaxial cable connector, such as by an F-type connector, as known in the art.

The coaxial cable connector 32 also preferably includes amplifier means 35 for amplifying the cable television signals to prevent excessive attenuation and to provide subsignals of a sufficient power level to each reconfigurable outlet assembly. Although the illustrated amplifier is mounted on the printed circuit board 22, the amplifier need not be mounted on the printed circuit board, but, instead, could be mounted to an interior wall of the housing 12 of the communications network interface device 10, for example. As shown in FIGS. 3 and 4, the amplifier is generally connected to an external power supply, such as via connector 36, which provides a supply voltage, typically 110 volts, to the amplifier.

Following amplification, the amplified cable television signals are connected to splitter means 38, such as a splitter, for dividing the incoming cable television signal into a plurality of cable television subsignals. In particular, both the amplifier 35 and the splitter means can include a pair of coaxial cable connectors 40 and 41, such as F-type connectors, for threadably engaging opposed end portions of a coaxial cable which transmits the amplified cable television signals. Alternatively, the cable television subsignals could be amplified after they have been split without departing from the spirit and scope of the present invention.

According to this embodiment, connector 41 of the splitter 38 preferably connects the coaxial jumper cable to a conductive trace 24 defined in the printed circuit board 22.

The conductive trace can then be divided or split into a plurality of conductive traces such that the signal transmitted via the coaxial source cable is split into a plurality of subsignals, one of which is transmitted by each of the divided conductive traces defined on the printed circuit board. The splitter is shown in block diagram form in FIG. 2 and a portion of the conductive traces of splitter is illustrated, in more detail, on the front surface of the printed circuit board in FIGS. 3 and 4. The remainder of the conductive traces, as well as the associated electrical components of this embodiment are generally mounted on the rear surface of the printed circuit board.

As shown in FIG. 2, the communications network interface device 10 also preferably includes output means 44, responsive to the subdividing means 18, for arranging the plurality of distribution conductors 20 into a plurality of cables 46. Each cable preferably includes a plurality of distribution conductors which transmit subsignals originating with a plurality of types of electrical sources. In one embodiment, each cable includes distribution conductors which transmit subsignals originating with each of the different types of electrical sources. Although not illustrated, the system hereof may include a balun for load balancing purposes.

In the illustrated example of FIG. 2, the communications network interface device 10 is adapted to receive three source cables 16 which transmit signals for first and second telephone lines and for cable television, respectively. Thus, each cable 46 preferably includes distribution conductors which transmit subsignals originating with each of the first and second telephone lines as well as cable television subsignals. More specifically, FIG. 2 illustrates the distribution conductors for the first telephone line as a line of alternating long and short dashes, the distribution conductors for the second telephone line as a dotted line, and the distribution conductors for the cable television subsignals as a dashed line.

According to one embodiment, the output means 44 includes a plurality of second connectors 48, such as 110-type connectors, having a plurality of conductors 50. For illustrative purposes, one of the second connectors is shown exploded from the printed circuit board 22 in FIG. 3. Each conductor can have an insulation displacement contact portion at a first end for establishing electrical contact with a predetermined one of the distribution conductors 20. For the sake of clarity, however, the distribution conductors are not shown in FIGS. 3 and 4. Each conductor can also be adapted at a second end 52, opposite the first end, for electrically contacting a predetermined conductive trace 24 defined on the printed circuit board such that the respective distribution conductor is electrically connected with a predetermined electrical source. More particularly, the subsignal transmitted by the respective distribution conductor from a predetermined electrical source is coupled, by a conductor of the second connector, to a respective conductive trace.

Preferably, the output means 44 includes a respective second connector 48 for each reconfigurable outlet assembly 54. Thus, although the illustrated communications network interface device includes sixteen second connectors to support sixteen separate outlet assemblies, the communications network interface device can include any number of second connectors without departing from the spirit and scope of the present invention.

More particularly, the insulation displacement contact portions of the plurality of conductors 50 of each second connector 48 establish electrical connection with each of the plurality of distribution conductors 20 of a respective cable 46. In addition, the second ends 52 of the plurality of conductors of each second connector electrically contact respective ones of the plurality of the conductive traces 24 defined on the printed circuit board 22 which transmit signals originating with a plurality of types of electrical sources. Typically, the second ends of the plurality of conductors extend through respective plated through holed defined in the printed circuit board.

Accordingly, each cable 46 preferably includes distribution conductors 20 which are electrically connected to a plurality of different types of electrical sources. For example, a source cable 16, such as a telephone drop cable, can be received by and electrically connected to a first connector 30 mounted on the printed circuit board 22. In particular, the source cable is inserted into the insulation displacement contact portion of an elongate conductor of the first connector such that the elongate conductor makes electrical contact with the source cable. As described above, the elongate conductor is connected at a second end to a conductive trace 24 defined on the printed circuit board. The conductive trace therefore transmits the same signals transmitted by the source cable. As described above, the second ends of the elongate conductors 50 of a plurality of second connectors 48 are also preferably in electrical contact with the conductive trace transmitting the signals from the source cable.

Likewise, a coaxial source cable, such as a cable television drop cable, can be received by a connector 32 mounted on the printed circuit board 22. The signals transmitted by the coaxial source cable may then be amplified and split into a plurality of subsignals, each of which includes the information provided by the original signals. In particular, the amplified signal can be coupled to a conductive trace 24 defined on the printed circuit board. The conductive trace is preferably divided into a plurality of conductive traces such that the signals transmitted via the coaxial source cable may be split into a plurality of subsignals, each of which are transmitted by one of the divided conducted traces. As described above, the second ends 52 of the elongate conductors 50 of the plurality of second connectors 48 are preferably in electrical contact with the divided conductive traces which transmit the subsignals. In particular, one divided conductive trace portion is preferably in electrical contact with one elongate conductor of each of the plurality of second connectors.

By inserting distribution conductors 20 into the insulation displacement contact portions of the elongate conductors 50 of the plurality of second connectors 48, electrical connection can be effectively established between the source cables 16 transmitting source signals and respective distribution conductors. As shown in FIG. 2, the distribution conductors can then be arranged into cables 46 which, in one embodiment, each include a distribution conductor which is electrically connected to each of the plurality of electrical sources. Accordingly, the input source signals can each be split into a plurality of subsignals which are routed, via the cable, to each of the reconfigurable outlet assemblies 54.

Figure 5:
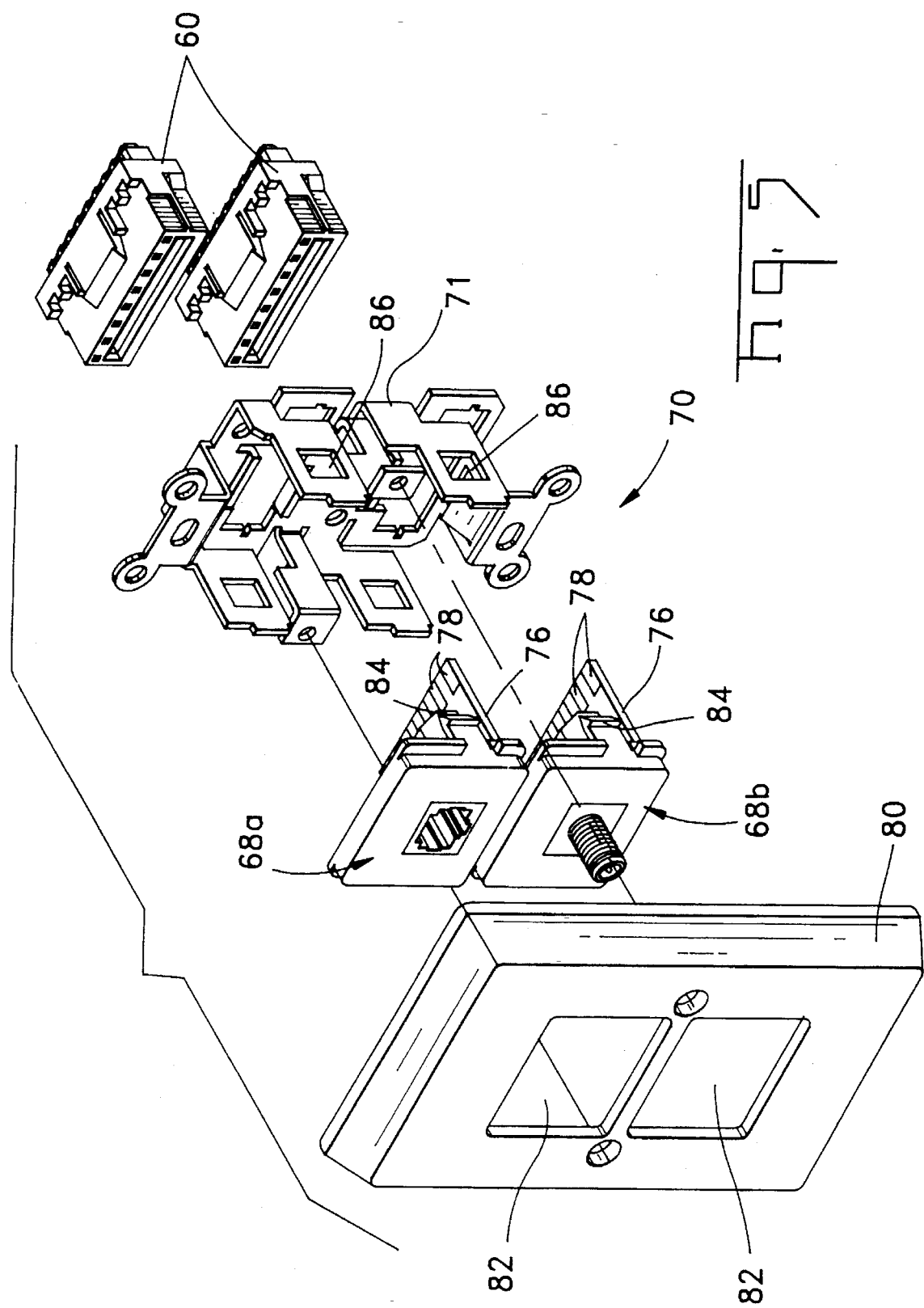
FIG. 5 is an exploded perspective view of a reconfigurable outlet assembly of the communications wiring system of the present invention.
Figure 6:
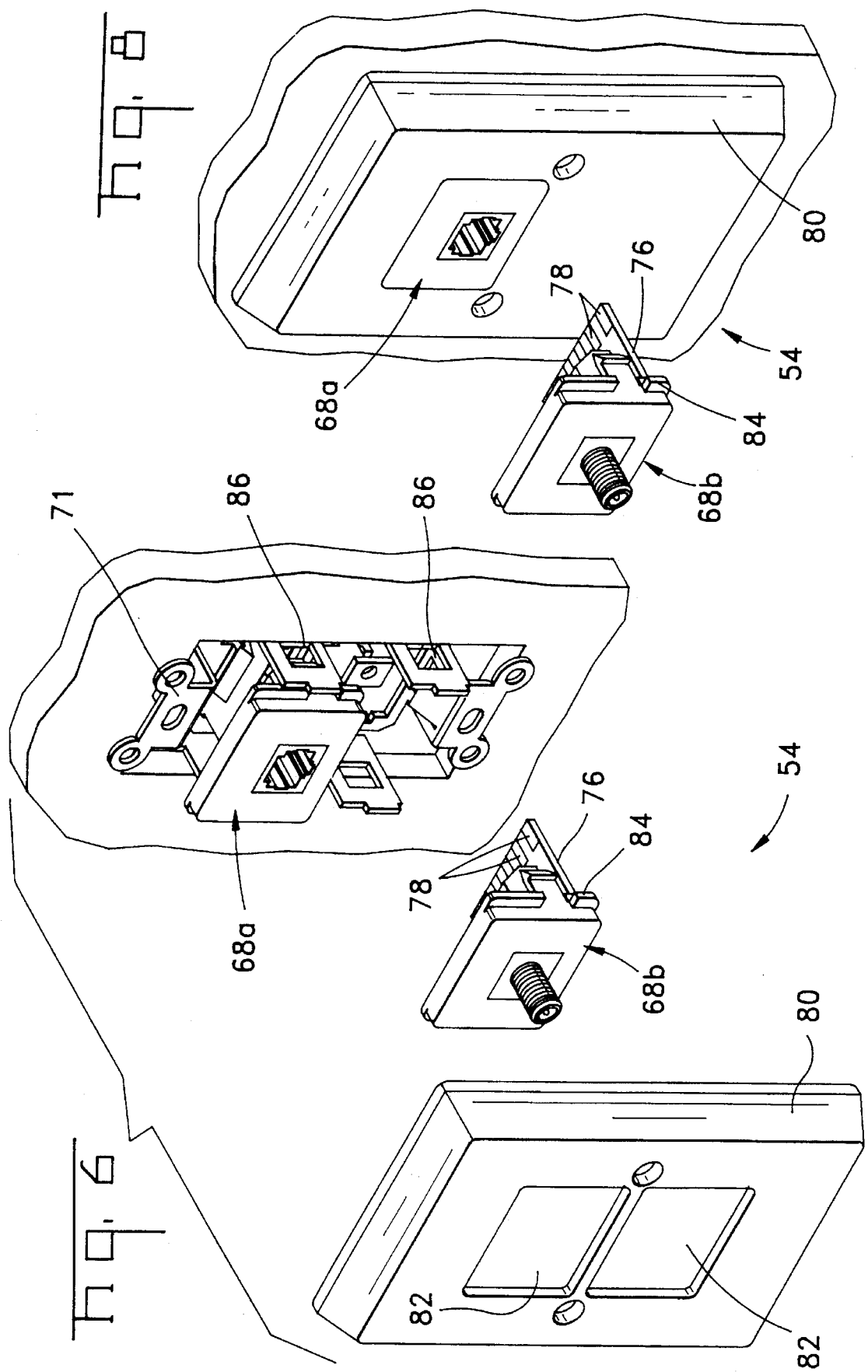
FIG. 6 is a perspective view of a partially assembled reconfigurable outlet assembly illustrating two types of modular jacks.
Figure 7:
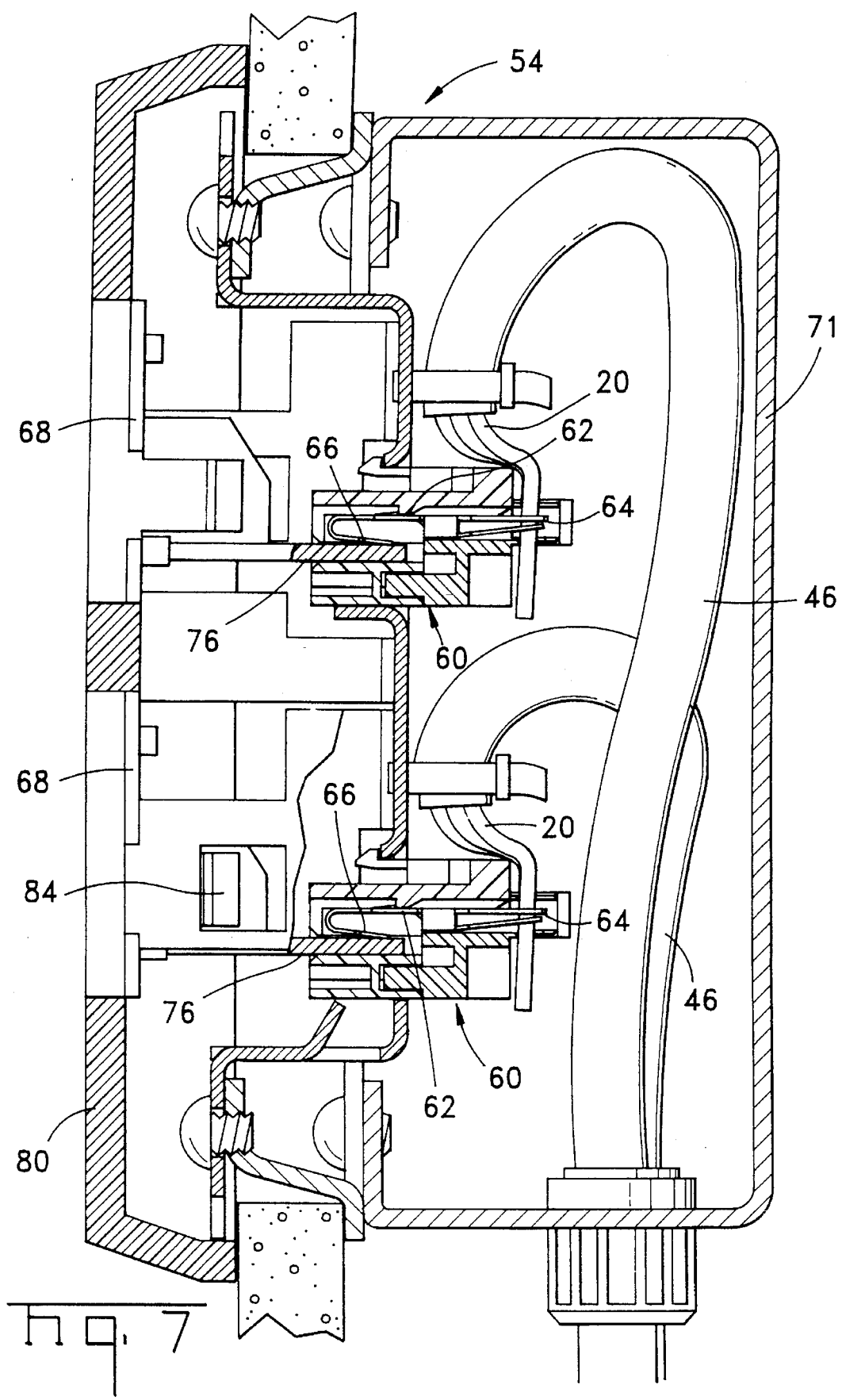
FIG. 7 is a cross-sectional view of an assembled reconfigurable outlet assembly following installation, such as in a wall.

As shown in FIG. 1, each cable 46 is preferably routed to a predetermined location within the house and is typically terminated at a reconfigurable outlet assembly 54. The reconfigurable outlet assembly selectively establishes electrical connection with the plurality of electrical sources via a respective cable. As shown in the exploded view of FIG. 5, in the partially assembled view of FIG. 6 and in the assembled cross-sectional view of FIG. 7, the reconfigurable outlet assembly generally includes an outlet having connector means 60 for positioning predetermined ones of the plurality of distribution conductors 20 of the respective cable in a predetermined order.

The connector means generally includes a plurality of elongate conductors 62. Each elongate conductor preferably includes an insulation displacement contact portion 64 at a first end for establishing electrical contact with a predetermined distribution conductor of the respective cable. Each elongate conductor can also include a resilient contact portion 66 at a second end, opposite the first end, for establishing electrical contact with a modular jack 68. One exemplary connector means is the edge connectors described in detail in U.S. Pat. No. 4,756,695 which issued on Jul. 12, 1988 to David Lane, et al. and is assigned to The Whitaker Corporation, the contents of which are incorporated herein by reference.

Each reconfigurable outlet assembly 54 also preferably includes a plurality of interchangeable connectors, such as modular jacks 68, for example, adapted to be removably mounted to the connector means 60 of the outlet. In particular, each modular jack includes means for establishing electrical connection with the distribution conductors 20 of the respective cable 46 which are connected to a predetermined electrical source. Thus, a modular jack or other electrical connector can be selectively mounted to the outlet to effectively establish electrical connection with a predetermined electrical source.

Each modular jack 68 also preferably includes removal means for disconnecting the modular jack from the respective cable 46. Accordingly, the modular jack can be removed from the outlet and another of the plurality of interchangeable modular jacks mounted to the outlet to establish electrical connection with one or more other distribution conductors 20. Thus, electrical connection can be made with another electrical source.

The plurality of interchangeable modular jacks 68 are preferably selected such that each modular jack establishes electrical connection with a distribution conductor 20 which is connected to a different predetermined electrical source. By selecting an appropriate modular jack, electrical connection can therefore be made with any of the plurality of electrical sources.

For example, the plurality of modular jacks 68 can include a telephone jack 68a and a cable television jack 68b which are adapted to mate with and make electrical contact with predetermined conductors of the connector means 60. Accordingly, each modular jack preferably includes means, such as a printed circuit board 76 having conductive traces 78 defined thereon, for electrically contacting predetermined elongate conductors of the respective connector means. Each modular jack also preferably includes conductor means for contacting the conductive traces defined on the printed circuit board of the modular jack and for providing those conductors in an appropriate receptacle. For example, the second end of the conductors of a telephone jack typically includes resilient contact portions for establishing electrical contact with an appropriate plug inserted therein. In addition, the conductors of a cable television jack preferably define a coaxial cable jack for engaging a coaxial cable connected to the subscriber's television. According to one embodiment, the outlet includes a housing 70. The housing generally includes a wall box 71 typically comprised of a metallic or plastic material. The housing is generally securely mounted to a support, such as a stud, within a wall of the building or on a movable partition wall. In any case, the housing defines an internal cavity which opens through a first surface of the housing. In this embodiment, the first surface of the housing can include a wall plate 80 which is mounted to the wall box and which defines at least one opening 82 therethrough. Preferably, a number of openings equal to the number of edge connectors 60 mounted within the housing are defined in the wall plate.

As illustrated, the edge connectors 60 are preferably disposed within the internal cavity defined by the housing 70 of the outlet 54. In the embodiment illustrated in FIGS. 5–7, the reconfigurable outlet assembly is adapted to receive two cables 46, each of which is connected to a respective edge connector. However, the reconfigurable outlet assembly can receive one or any number of cables without departing from the spirit and scope of the present invention. For example, a reconfigurable outlet assembly which receives a single cable and, consequently, mates with a single modular jack 68 at a time, for example, is shown in FIG. 8.

Each of the plurality of interchangeable modular jacks 68 or connectors are preferably sized to be inserted within the internal cavity of the outlet 54 and to removably mount to the edge connector 60. Each modular jack also preferably includes removal means, such as a deflectable tab 84 having a raised shoulder. Correspondingly, the housing 70 can include means, such as an aperture or window 86 defined therein, for deflecting and cooperatively engaging the deflectable tab and, more particularly, the raised shoulder of the deflectable tab as the modular jack is inserted therein.

Accordingly, each modular jack 68 is securely held within the internal cavity of the outlet 54 so as to thereby establish electrical connection with predetermined conductors of the connector means 60 of the outlet. Each modular jack is adapted to be removed from the outlet, however, and replaced by another modular jack which makes contact with other predetermined conductors of the connector means and, therefore, is electrically connected with another electrical source. In particular, the deflectable tab 84 can be deflected, such as with a screwdriver, whereby the modular jack can be unplugged from the connector means of the outlet and removed therefrom.

While a source cable 16 including a single telephone line is principally described, the communications wiring system can include two or more separate telephone lines. In this embodiment, each telephone line is individually split and routed to each of the plurality of reconfigurable outlet assemblies 54 such that separate connection can be established with each of the plurality of telephone lines by mounting an appropriate modular jack 68 in the outlet.

In addition, although source cables 16 transmitting telephone signals and cable television signals are illustrated and described herein, the source cables can also include cables or other conductors transmitting a variety of signals, such as low voltage DC power signals. Accordingly, the reconfigurable outlets 54 can include electrical outlets or jacks 68 for establishing electrical connection with these other sources, such as modular electrical outlets for establishing electrical connection with the low voltage DC power source. As will be apparent to those skilled in the art, the modular electrical outlets generally include different types of connectors to make secure electrical connection with the distribution conductor 20 transmitting the DC power signal.

Alternatively, the modular jack 68 can include a receiver, such as a microphone, for receiving signals. According to this embodiment, another interchangeable modular jack of the communications wiring system can include a speaker for transmitting signals, such as those received by the receiver. Accordingly, a receiver can be installed in an outlet of a first reconfigurable outlet assembly 54 and a speaker can be installed in a second reconfigurable outlet assembly. The speaker and the receiver can be interconnected, via the distribution conductor of the communications wiring system of the present invention, such that the signals received by the receiver in a first room are transmitted or broadcast by the speaker in the second room.

Accordingly, the communications wiring system of the present invention, including the plurality of reconfigurable outlet assemblies 54, can be readily modified to provide electrical connection with a variety of electrical sources via a single outlet and without significant rewiring. In particular, a first modular jack 68 which provides electrical connection with a first electrical source can be readily removed from the outlet and a second modular jack which provides electrical connection with a second electrical source can be installed or mounted within the outlet, without rewiring the outlet. Thus, electrical connection with a plurality of types of electrical sources can be sequentially provided by a single outlet without rewiring.

For example, a receiver can initially be installed within a first outlet 54 positioned in a child's bedroom and a corresponding speaker can be installed in a second outlet located in the parents bedroom such that the parents can monitor the child's behavior. As the child grows older, the receiver can be removed and a cable television jack 68b installed in the child's room so that a television can be placed in the child's bedroom which receives cable television signals. Further, as a child grows still older, the child may desire to have a telephone in their bedroom, instead of a television. Accordingly, the cable television jack can be removed from the outlet and a telephone jack 68a inserted in the same outlet to provide access to a telephone line.

In the drawings and the specification, there has been set forth a preferred embodiment of the invention and, although specific terms are employed, the terms are used in a generic and descriptive sense only and not for purpose of limitation, the scope of the invention being set forth in the following claims.

What is claimed is:

1. A communications wiring system comprising:

a communications network interface device for routing a plurality of source signals from a plurality of types of electrical sources, wherein each source cable transmits a source signal from a predetermined electrical source, said communications network interface device comprising:

subdividing means for splitting each source signal into a predetermined number of subsignals, said subdividing means comprising a plurality of distribution conductors wherein each distribution conductor transmits a predetermined one of said subsignals; and output means, responsive to said subdividing means, for arranging said plurality of distribution conductors into a plurality of cables wherein each cable includes a plurality of distribution conductors which transmit subsignals originating with a plurality of types of electrical sources; and a plurality of reconfigurable outlet assemblies for selectably establishing electrical connection with the plurality of electrical sources via a respective cable, each reconfigurable outlet assembly comprising:

an outlet comprising connector means for positioning said distribution conductors of a respective cable in a predetermined order; and a plurality of interchangeable electrical connectors adapted to be removably mounted to said connector means of said outlet, each said connector including means for establishing electrical connection with the distribution conductors of the respective cable which are connected to a predetermined electrical source such that each electrical connector establishes electrical connection with a predetermined electrical source, each electrical connector also including removal means for disconnecting said connector from the cable such that the electrical connector can be removed from said outlet such that another of said plurality of interchangeable electrical connectors can be mounted to said outlet to thereby establish electrical connection with other distribution conductors of the respective cable which are connected to another predetermined electrical source such that electrical connection is established with the other electrical source.

2. A communications wiring system according to claim 1 wherein said connector means of said outlet comprises a plurality of elongate conductors, each elongate conductor having an insulation displacement contact portion at a first end for establishing electrical contact with a predetermined distribution conductor of the respective cable, each elongate conductor also having a resilient contact portion at a second end, opposite the first end, for establishing electrical contact with an electrical connector, wherein the resilient portions of said elongate conductors are arranged in the predetermined order.

3. A communications wiring system according to claim 1 wherein said plurality of electrical connectors of said reconfigurable outlet assemblies are selected from the group consisting of a telephone jack, a cable television jack, a speaker, a receiver, and a low voltage DC power outlet.

4. A communications wiring system according to claim 1 wherein said outlet of said reconfigurable outlet assembly comprises a housing having a first surface and defining an internal cavity which opens through said first surface, and wherein each of said plurality of interchangeable electrical connectors are sized to be individually inserted within the internal cavity of said outlet and to removably mount to said connector means of said outlet.

5. A communications wiring system according to claim 4 wherein said removal means of said electrical connector of each reconfigurable outlet assembly includes a deflectable tab having a raised shoulder, and wherein said housing includes means for deflecting the deflectable tab and cooperatively engaging said electrical connector as said electrical connector is inserted therein such that said electrical connector is removably mounted to said outlet.

6. A communications wiring system according to claim 1 wherein said communications network interface device further comprises input means for receiving the plurality of source cables which are communicably connected to predetermined ones of a plurality of types of electrical sources.

7. A communications wiring system according to claim 6 wherein at least one of said source cables is a coaxial cable for transmitting cable television signals, and wherein said subdividing means further comprises amplifier means, responsive to said coaxial cable, for amplifying the cable television signals transmitted by said coaxial cable.

8. A communications wiring system according to claim 6 wherein said subdividing means of said communications network interface device comprises a printed circuit board defining a plurality of conductive traces thereon, and wherein said input means comprises a first connector including a plurality of conductors, each conductor having an insulation displacement contact portion at a first end for establishing electrical contact with a predetermined one of said source cables, and being adapted at a second end, opposite the first end, for electrical contact with a predetermined conductive trace defined on said printed circuit board.

9. A communications wiring system according to claim 7 wherein said output means of said communications network interface device comprises a plurality of second connectors, wherein each second connector includes a plurality of conductors, each conductor having an insulation displacement contact portion at a first end for establishing electrical contact with a predetermined one of said distribution conductors, and being adapted at a second end, opposite the first end, for electrical contact with a predetermined conductive trace defined on said printed circuit board such that each distribution conductor is electrically connected with a predetermined electrical source.

10. A communications wiring system according to claim 9 wherein said insulation displacement contact portions of said plurality of conductors of each second connector establish electrical connection with respective ones of said plurality of distribution conductors of a respective cable, and wherein said second ends of said plurality of conductors of each second connector electrically contact respective ones of a plurality of conductive traces defined on said printed circuit board which transmit signals originating with a plurality of types of electrical sources.

11. A communications network interface device comprising:

input means for receiving a plurality of source cables which are communicably connected to predetermined ones of a plurality of types of electrical sources, wherein each source cable transmits a source signal from a predetermined electrical source;

subdividing means, responsive to said input means, for splitting the source signal transmitted by each of said plurality of source cables into a predetermined number of subsignals, said subdividing means comprising a plurality of distribution conductors wherein each distribution conductor transmits a predetermined one of said subsignals; and output means, responsive to said subdividing means, for arranging said plurality of distribution conductors into a plurality of cables wherein each cable includes a plurality of distribution conductors which transmit subsignals originating with a plurality of types of electrical sources.

12. A communications network interface device according to claim 11 wherein at least one of said source cables is a coaxial cable for transmitting cable television signals, and wherein said subdividing means further comprises amplifier means, responsive to said coaxial cable, for amplifying the cable television signals transmitted by said coaxial cable.

13. A communications network interface device according to claim 11 wherein said subdividing means comprises a printed circuit board defining a plurality of conductive traces thereon, and wherein said input means comprises a first connector including a plurality of conductors, each conductor having an insulation displacement contact portion at a first end for establishing electrical contact with a predetermined one of said source cables, and being adapted at a second end, opposite the first end, for electrical contact with a predetermined conductive trace defined on said printed circuit board.

14. A communications network interface device according to claim 13 wherein said output means comprises a plurality of second connectors, wherein each second connector includes a plurality of conductors, each conductor having an insulation displacement contact portion at a first end for establishing electrical contact with a predetermined one of said distribution conductors, and being adapted at a second end, opposite the first end, for electrical contact with a predetermined conductive trace defined on said printed circuit board such that each distribution conductor is electrically connected with a predetermined electrical source.

* * * * *